(12) United States Patent
Scheffel

(10) Patent No.: US 7,684,950 B2
(45) Date of Patent: Mar. 23, 2010

(54) SYSTEM FOR DETECTING AND TRANSMITTING TEST DATA FROM A PRESSURE CHAMBER FILLED WITH A HIGH-PRESSURE FLUID

(75) Inventor: Gerd Scheffel, Korschenbroich (DE)

(73) Assignee: Parker-Hannifin Corporation, Cleveland, OH (US)

( * ) Notice: Subject to any disclaimer, the term of this patent is extended or adjusted under 35 U.S.C. 154(b) by 833 days.

(21) Appl. No.: 10/551,853

(22) PCT Filed: Mar. 31, 2004

(86) PCT No.: PCT/DE2004/003373

§ 371 (c)(1),
(2), (4) Date: Sep. 21, 2006

(87) PCT Pub. No.: WO2004/088145

PCT Pub. Date: Oct. 14, 2004

(65) Prior Publication Data

US 2007/0050171 A1 Mar. 1, 2007

(30) Foreign Application Priority Data

Apr. 3, 2003 (DE) ................................. 103 15 369

(51) Int. Cl.
*G06F 17/40* (2006.01)

(52) U.S. Cl. ............................. 702/127; 361/600; 702/1

(58) Field of Classification Search .................. 73/1.35, 73/30.02, 61.47, 61.67, 61.78, 114.33, 1.01, 73/1.57, 23.2, 30.01, 53.01, 61.41, 61.43, 73/61.63, 61.65, 114.31, 114.32, 152.01, 73/152.51, 700, 715, 753, 754, 756, 760, 73/763, 768; 340/451, 425.5, 438, 500, 540, 340/603, 626; 702/98, 140, 1, 85, 127, 138; 700/203, 90, 95, 117, 197, 200, 301; 137/1, 137/2, 3, 7, 12, 14; 361/271, 277, 280, 283.1, 361/283.4, 600; 376/245, 247

See application file for complete search history.

(56) References Cited

U.S. PATENT DOCUMENTS

| 3,268,683 | A | * | 8/1966 | Palmer | ...................... 200/83 N |
| 4,813,448 | A | * | 3/1989 | Leiber | ...................... 137/487.5 |
| 5,150,103 | A | * | 9/1992 | Janssen-Weets | .......... 340/686.3 |
| 5,159,525 | A | * | 10/1992 | Tate | ........................ 361/283.1 |

(Continued)

FOREIGN PATENT DOCUMENTS

| DE | 4228307 A1 | 3/1994 |
| DE | 19510447 A1 | 8/1996 |
| DE | 19724076 A1 | 12/1998 |
| DE | 19841258 C | 3/2000 |
| EP | 0105219 A | 4/1984 |
| EP | 0439037 A | 5/1991 |
| JP | 2066784 U | 11/1990 |
| WO | WO 94/10548 A1 * | 5/1994 |
| WO | 0241332 A1 | 5/2002 |

*Primary Examiner*—Edward R Cosimano
(74) *Attorney, Agent, or Firm*—Daniel J. Whitman

(57) ABSTRACT

The invention relates to an arrangement for detecting and transmitting test data from a housing (10) including a pressure chamber (11) that is filled with a high-pressure fluid and is homogeneously pressurized via strip conductors (21) which are connected to a sensor (23) and are guided out of the housing (10). A circuit board (12), both faces of which are subjected to the pressure prevailing in the pressure chamber (11) and at least one portion (30) of which extends out of the housing is disposed inside the pressure chamber (11) as a support of the strip conductors (21). The housing (10) that encloses the pressure chamber (11) is separated on the plane of the printed board (12), the faces of the housing halves (13, 14) clamping the printed board (12) in such a way that radial forces exercised within the printed board when pressure is applied are absorbed by the housing.

16 Claims, 2 Drawing Sheets

U.S. PATENT DOCUMENTS

| | | | | |
|---|---|---|---|---|
| 5,174,158 A | * | 12/1992 | Kremidas | 73/721 |
| 5,224,384 A | * | 7/1993 | Kremidas et al. | 73/721 |
| 5,303,593 A | * | 4/1994 | Kremidas | 73/708 |
| 5,317,920 A | * | 6/1994 | Kremidas | 73/720 |
| 5,319,980 A | * | 6/1994 | Kremidas | 73/721 |
| 5,343,757 A | * | 9/1994 | Tate | 73/724 |
| 6,152,172 A | * | 11/2000 | Christianson et al. | 137/554 |
| 7,164,336 B2 | * | 1/2007 | Rausch et al. | 335/220 |
| 7,363,819 B2 | * | 4/2008 | Mast et al. | 73/754 |
| 2004/0200286 A1 | * | 10/2004 | Mast | 73/715 |

* cited by examiner

SYSTEM FOR DETECTING AND TRANSMITTING TEST DATA FROM A PRESSURE CHAMBER FILLED WITH A HIGH-PRESSURE FLUID

TECHNICAL FIELD

The present invention relates to a system for detecting and transmitting test data from a housing having a pressure chamber that is filled with a high-pressure fluid and is homogeneously pressurized.

BACKGROUND OF THE INVENTION

In the field of hydraulic valves, for example, there is frequently the problem of detecting the movement of a movable valve piston in the enclosure filled with a high-pressure fluid using a position measuring system. In the context of known systems, for example, a push rod attached to the valve piston is guided out of the housing and is coupled to a position measuring system, for example in the form of an LVDT system, situated outside of the housing. This is associated with the disadvantage that the sealing of the push rod leading out of the pressure chamber is complex and can also represent a weak point over the life of the valve. Another disadvantage is that the additional placement of a position measuring system outside of the housing enlarges the axial length of such hydraulic valves.

SUMMARY OF THE INVENTION

The object of the present invention is therefore to provide a system for detecting and transmitting test data from a pressure chamber filled with a high-pressure fluid which reduces the sealing problems and the use of which results in smaller dimensions of the objects in question.

The achievement of this objective including advantageous embodiments and enhancements of the present invention is derived from the content of the claims which follow this description.

In its basic idea, the present invention provides a system in which at least one sensing element is situated in the pressure chamber and is connected to printed conductors guided out of the housing, a circuit board, both faces of which are subjected to the pressure prevailing in the pressure chamber and at least one portion of which extending out of the housing, being situated in the pressure chamber as a support for the printed conductors, and the housing that encloses the pressure chamber being separated in the plane of the circuit board and the faces of the housing halves clamping a circuit board between them in such a way that radial forces within the circuit board are absorbed when pressure is applied.

The path taken by the present invention of integrating a circuit board in the pressure chamber of a housing is uncommon because the high pressures prevailing in the pressure chamber can deform the circuit board material under compression loading so that the circuit board expands or is deformed radially under compression loading. For that reason, according to the present invention, the clamping of the circuit board between the housing halves of the separated housing is performed in such a way that the radial forces originating from the clamping are absorbed by the housing halves. Furthermore, a portion of the circuit board leads out of the housing in order to create the possibility of connecting appropriate measured value or signal processing devices. The present invention is suitable for circuit boards made from a hard plastic; additional materials are also possible for manufacturing appropriate circuit boards.

For example, U.S. Pat. No. 3,268,683 describes vacuum switches in which a membrane having a projection guided out of the housing as a support for electrical contacts is situated in a pressure chamber enclosed by a housing. The membrane is designed to be electrically conductive and is used to supply power to the electrical switching contact located on it. In contrast to the system of the present invention, however, different pressures prevail on both sides of the membrane so that as a function of the level of the different pressures, the membrane moves back and forth in the pressure chamber in order to perform the desired switching operation. For that reason, the problem of a deformation of this membrane does not occur.

A first embodiment of the present invention provides that the housing halves hold the circuit board by a frictional connection.

Another advantageous embodiment of the present invention provides that the housing halves hold the circuit board by a positive connection, it being described in detail that the one housing half encompasses the opposite facing other housing half externally via an axially projecting flange, the external edge area of the circuit board being in contact with the inside of the flange. Using such a design, a type of labyrinthine mount is created for the circuit board, the mount being supported against the inside of the flange.

At the same time, this design creates the possibility of largely avoiding sealing problems.

In order to make it possible to guide the circuit board out of the housing, an exemplary embodiment of the present invention provides that the flange has a cutout extending across a limited circumferential portion, which is penetrated by a projection extending outwardly from the circuit board.

Seals may be provided between the faces of the housing halves clamping the circuit board and the surfaces of the circuit board.

According to the present invention, the circuit board may have a recess used to equalize pressure between sub-chambers of the pressure chamber located on both sides of the circuit board.

This recess makes it possible in particular to connect a position measuring system to the circuit board; it being provided to this end that the circuit board is designed to accommodate a position measuring system and a position pickup coil being situated in the recess and connected to printed conductors located on the circuit board, the position pickup coil lying in the fluid located in the pressure chamber surrounding a position pickup core which is axially movable through the recess of the circuit board and the position pickup coil.

If a position pickup coil of this type has a wire winding wound on a coil frame, it is only possible to use a position pickup coil of this type in a non-conductive fluid. In order to avoid this use restriction, one exemplary embodiment provides that the wire winding of the position pickup coil located on the coil frame is spray coated with a suitable material. This advantageously avoids contact between the fluid and the wire windings, also making it possible to use conductive fluids. In addition, it is also not possible to adversely affect the wire winding even in a non-conductive fluid. In connection with this embodiment, it may also be provided that the spray coating of the wire winding includes the connectors of the wire winding to the printed conductors extending in the circuit board, it being advantageously possible for the material of the spray coating to match the material of the circuit board.

According to the present invention, it is also possible to design the circuit board as a pressure sensor with the possibility of detecting the pressure prevailing in the pressure chamber of the housing by providing at least one sensor on the circuit board that detects a change of length of the circuit board, for example, a strain gauge. As an alternative, it may be provided that a sensor recording a change of the material thickness of the circuit board is situated in the circuit board. In both cases, the change of shape of the circuit board with consideration of previous calibration is a measure of the pressure prevailing in the pressure chamber of the housing.

Furthermore, the present invention describes the use of an appropriately designed system for detecting the longitudinal movements of a movable valve piston in hydraulic valves so that the system according to the present invention avoids the disadvantages of the related art described at the outset with regard to hydraulic valves.

To the extent another design of the valves used in hydraulics or compressed air technology is described in WO 02/41332 A1, the system of the present invention is suitable in a particular manner for determining the movements of the movable coil frame in this valve design.

BRIEF DESCRIPTION OF THE DRAWINGS

The drawing shows exemplary embodiments of the present invention which are described below.

DETAILED DESCRIPTION OF THE INVENTION

Figure 1:
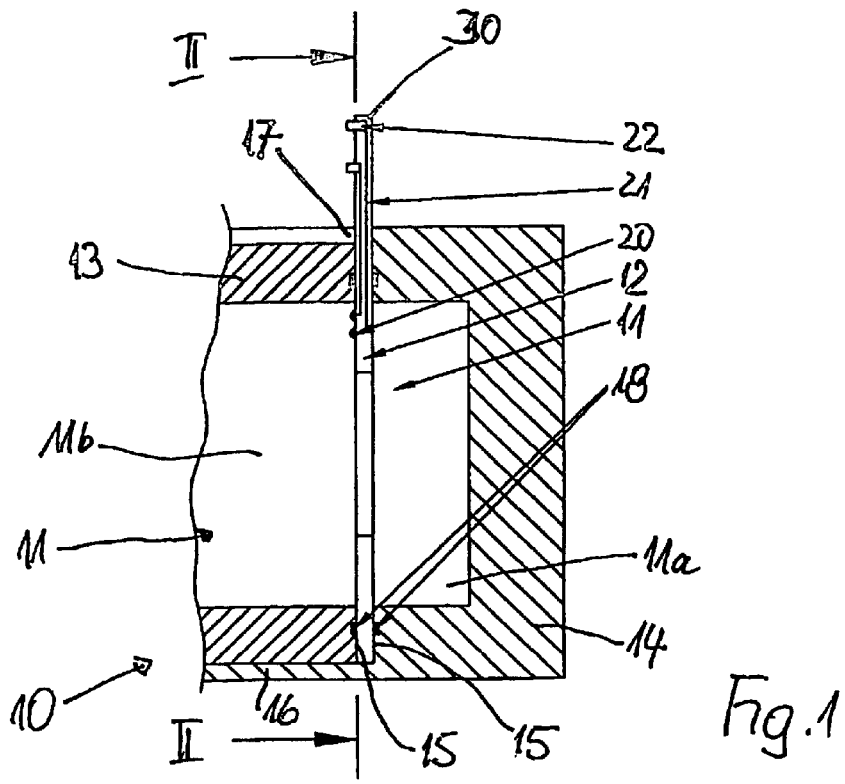
FIG. 1: shows a housing enclosing a pressure chamber including a circuit board situated in it in a sectional partial side view.

Housing 10 shown in partial section in FIG. 1 encloses a pressure chamber 11 in which a circuit board 12 is situated in such a way that sub-chambers 11a, 11b of pressure chamber 11 are located on both sides of circuit board 12. In the plane of the arrangement of circuit board 12, housing 10 is separated into one housing half 13 and one housing half 14, the faces 15 of which are adjacent to one another and clamp circuit board 12 between them. A flange 16 projecting axially from housing half 14 encompasses the outer circumference of housing half 13.

Figure 2:
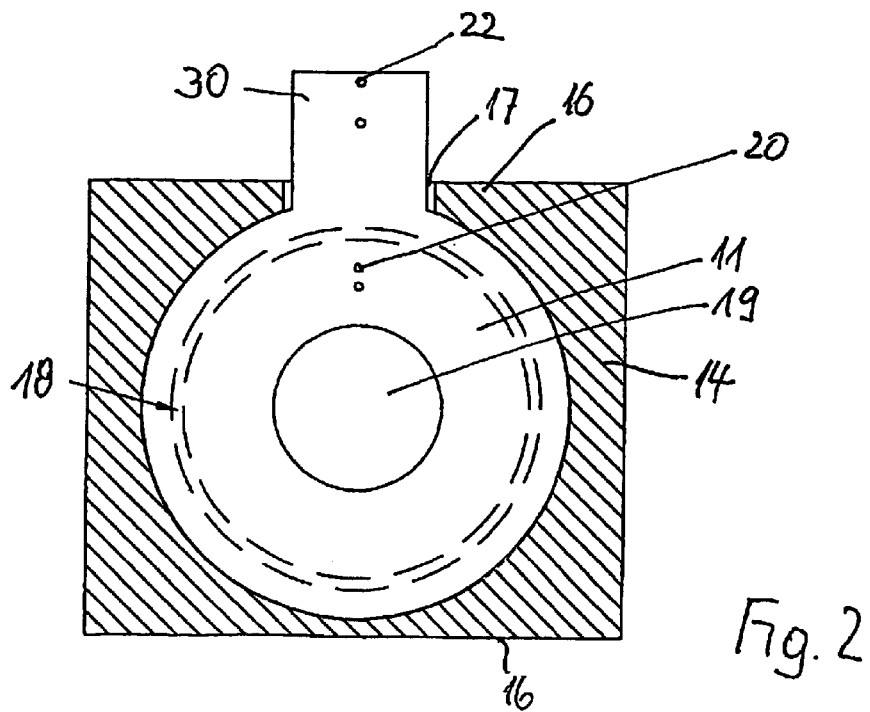
FIG. 2: shows a section of the object of FIG. 1 along line II-II in FIG. 1, FIG. 3: shows the object of FIG. 1 having an integrated position measuring system.

As a combined view of FIGS. 1 and 2 shows, flange 16 of housing half 14 is designed to have a cutout 17 through which a projection 30 located on circuit board 12 is guided out of the housing and projects above the outer circumference of the housing.

In order to seal the clamping of the circuit board, seals 18 in the form of O-rings are situated between faces 15 of housing halves 13 and 14 which clamp the circuit board 12 and the associated surfaces of circuit board 12, the O-rings being let into faces 15 of housing halves 13 and 14.

With respect to the transfer of test data from pressure chamber 11 of housing 10, contacts 20 are situated in the area of circuit board 12 lying in pressure chamber 11 to which printed connectors 21 are connected, which are situated in the circuit board body in the portion of circuit board 12 clamped between housing halves 13, 14 and extend into projection 30 extending outside of housing 10, external terminal contacts 22 connected to printed conductors 21 being provided on projection 30.

Thus contacts 20 generally make it possible to attach suitable sensing elements to circuit board 12, for example, in the form of a strain gauge or a sensor detecting change of the material thickness of circuit board 12 and to connect the outputs of the corresponding sensors to contacts 20 in order to thus transfer the test signals via printed conductors 21 to terminal contacts 22 lying outside of housing 20.

In the exemplary embodiment shown, with respect to the positioning of a sensing element in circuit board 12, a central recess 19 is positioned, which creates pressure equalization between sub-chambers 11a and 11b of pressure chamber 11 and also, as described with reference to FIG. 3, offers the possibility of integrating a position measuring system.

Figure 3:
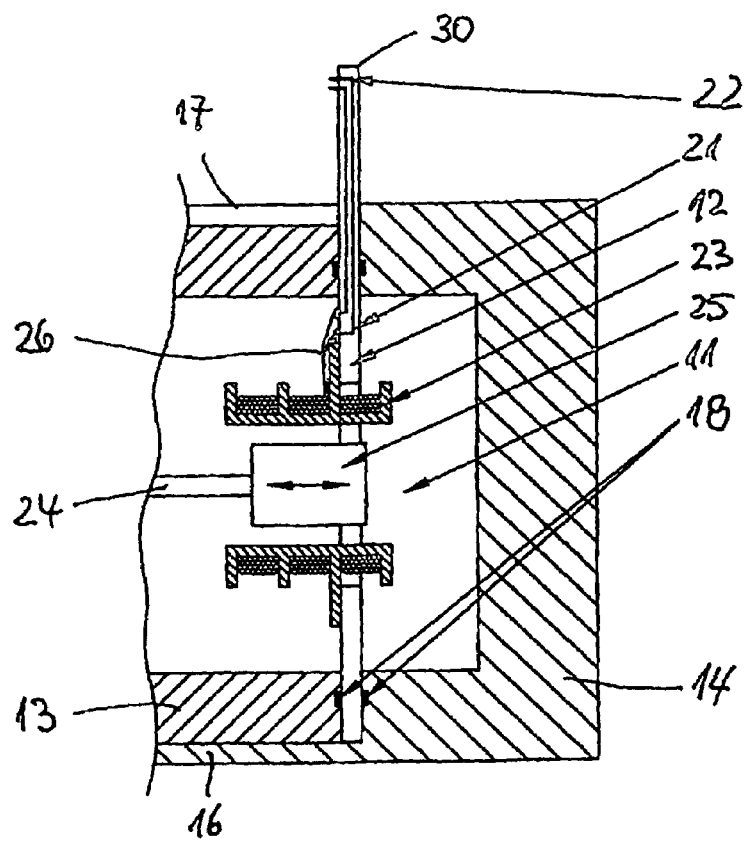

As FIG. 3 shows, a position pickup coil 23 is situated in recess 19 of circuit board 12 for setting up a position measuring system, the position pickup coil being connected to inner contacts 20 of circuit board 12 via connecting leads 26. A position pickup core 25 is axially movable in position pickup coil 23 and thus also in recess 19 of circuit board 12, the position pickup core being attached to the end of a push rod 24, it being possible for push rod 24 itself to be a part of a valve piston movable in a hydraulic valve when the system of the present invention is used, for example. Accordingly, the longitudinal movements of push rod 24 are to be detected by means of position measuring system 25, 23, the corresponding signals to be transferred outside the housing via electrical connections 22, 21, 20.

Figure 4:
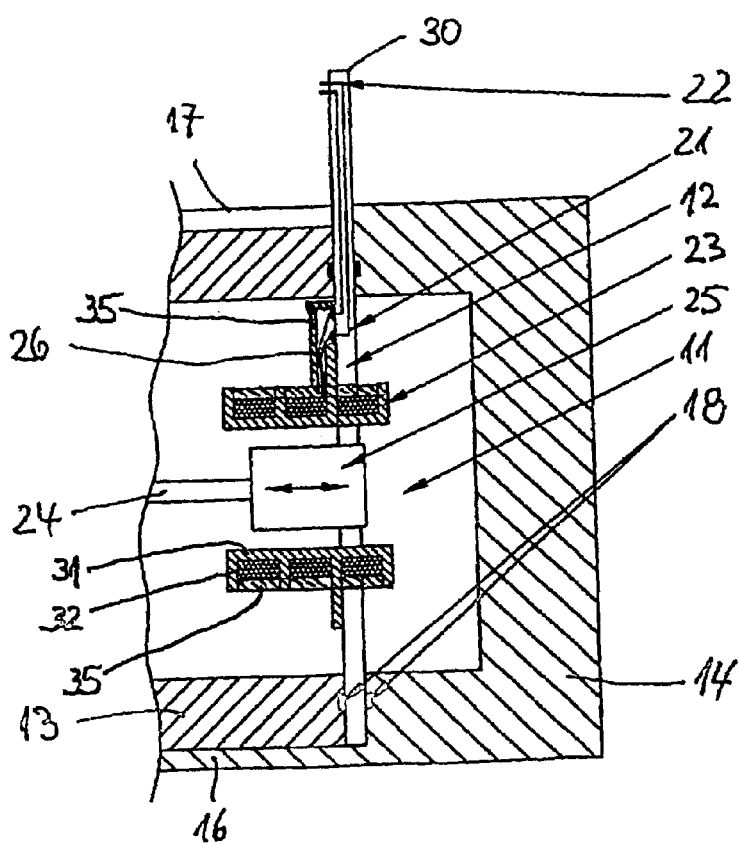
FIG. 4: shows the object of FIG. 3 having a spray coated position pickup coil.

As FIG. 4 shows, wire winding 32 located on coil frame 31 of position pickup coil 23 may be advantageously provided with a spray coating 35 which completely encloses wire winding 32 including the connections of the wire winding to printed conductors 21 extending in circuit board 12. This spray coating 35, which may be made from the same material as circuit board 12, thus making it possible to manufacture position pickup coil 23 including circuit board 12 uniformly, completely protects wire winding 32 from the action of the fluid present in pressure chamber 11 and completely surrounding position pickup coil 23.

As not shown in greater detail, circuit board 12 may also be in contact with a facing limiting wall of pressure chamber 11, the housing then only being separated in the area of this facing housing wall. The counterpressure acting in opposition to the pressure acting on the pressure chamber side of circuit board 12 is exerted by the housing wall acting as a brace.

The features of the objects of these documents described in the present description, the claims, the abstract and the drawing may be of significance for implementing the various embodiments of the present invention individually and also in any desired combinations of the above.

What is claimed is:

1. A system for detecting and transmitting test data from a housing (10) comprising a pressure chamber (11) that is filled with a high-pressure fluid and is homogeneously pressurized via printed conductors (21) connected to a sensing element (23) situated in the pressure chamber (11) and are guided out of the housing (10), a circuit board (12), both faces of which being subjected to the pressure prevailing in the pressure chamber (11) and at least one portion (30) of which extending out of the housing (10), being situated inside the pressure chamber (11) as a support for the strip conductors (21) and the housing (10) that encloses the pressure chamber (11) being separated in the plane of the circuit board and the faces of the housing halves (13, 14) clamping the circuit board (12)

between them in such a way that radial forces exerted within the circuit board are absorbed when pressure is applied.

2. The system as recited in claim 1, wherein the housing halves (13, 14) hold the circuit board (12) by a frictional connection.

3. The system as recited in claim 1, wherein the housing halves (13, 14) hold the circuit board (12) by a positive connection.

4. The system as recited in claim 1, wherein the circuit board (12) is made from a hard plastic.

5. The system as recited in claim 1, wherein seals (18) are situated between faces (15) of the housing halves (13, 14) which clamp the circuit board (12) and the surfaces of the circuit board (12).

6. The use of a system designed as recited in claim 1 for detecting the longitudinal movements of a valve piston movable in hydraulic valves.

7. The system as recited in claim 1, wherein one housing half (14) encompasses opposite facing other housing half (13) externally via an axially projecting flange (16), an external edge area of the circuit board (12) being in contact with an inside of the flange (16).

8. The system as recited in claim 7, wherein the flange (16) has a cutout (17) extending across a limited circumferential portion, which is penetrated by a projection (30) extending outwardly from the circuit board (12).

9. The system as recited in claim 1, wherein at least one sensor that detects a change of length of the circuit board (12) is situated on the circuit board (12).

10. The system as recited in claim 9, wherein the sensor is a strain gauge.

11. The system as recited in claim 9, wherein a sensor recording a change of the material thickness of the circuit board (12) is situated in the circuit board (12).

12. The system as recited in claim 1, wherein the circuit board (12) has a recess (19) used to equalize pressure between sub-chambers (11a, 11b) of the pressure chamber (11) located on both sides of the circuit board.

13. The system as recited in claim 12, wherein the circuit board is designed to accommodate a position measuring system and a position pickup coil (23) being situated in the recess (19) and connected to the printed conductors (21) located on the circuit board (12), the position pickup coil (23) lying in the fluid located in the pressure chamber (11) surrounding a position pickup core (25) which is axially movable through the recess (19) of the circuit board (12) and the position pickup coil (25).

14. The system as recited in claim 13, wherein a wire winding (32) of the position pickup coil (23) which is located on a coil frame (31) is spray coated with a suitable material.

15. The system as recited in claim 14, wherein the spray coating (35) of the wire winding (32) includes connections of the wire winding (32) to printed conductors (21) extending in the circuit board (12).

16. The system as recited in claim 14, wherein the material of the spray coating (35) matches the material of the circuit board (12).

* * * * *